United States Patent [19]
Getler et al.

[11] Patent Number: 6,048,565
[45] Date of Patent: Apr. 11, 2000

[54] PROCESS AND APPARATUS FOR CONVERTING LIQUID WHEY INTO POWDER

[75] Inventors: Jens Getler, Bronshoj; Poul Thomsen, Saeby; Lars Valentin Peters, Gentofte, all of Denmark

[73] Assignee: APV Anhydro AS, Soborg, Denmark

[21] Appl. No.: 09/155,545

[22] PCT Filed: Mar. 25, 1997

[86] PCT No.: PCT/DK97/00131

§ 371 Date: Nov. 24, 1998

§ 102(e) Date: Nov. 24, 1998

[87] PCT Pub. No.: WO97/35486

PCT Pub. Date: Oct. 2, 1997

[30] Foreign Application Priority Data

Mar. 25, 1996 [DK] Denmark .................................. 338/96
Mar. 25, 1996 [DK] Denmark .................................. 339/96

[51] Int. Cl.[7] ........................................................ A23C 1/00
[52] U.S. Cl. .............................. 426/583; 99/453; 99/454; 99/455; 426/588
[58] Field of Search .................................. 426/583, 580, 426/588; 99/453, 454, 455

[56] References Cited

U.S. PATENT DOCUMENTS

| | | |
|---|---|---|
| 1,763,633 | 6/1930 | Simmons . |
| 2,126,807 | 8/1938 | Pebbles . |
| 2,336,461 | 12/1943 | Beardslee . |
| 3,537,860 | 11/1970 | Moore et al. . |
| 5,006,204 | 4/1991 | Jensen . |

FOREIGN PATENT DOCUMENTS

| | | |
|---|---|---|
| 205601 | 2/1989 | European Pat. Off. . |
| 2493679 | 5/1982 | France . |
| 477224 | 12/1937 | United Kingdom . |
| 8603942 | 7/1986 | WIPO . |

OTHER PUBLICATIONS

"Influence de la cristallisation du lactose dans le concentre de serum sur l'hygroscopicite et l'agglomeration de la poudre de serum", Revue De L'agriculture, vol. 28, No. 4, 1975, pp. 963–975, XP002034855.

Abstract DATABASE WPI, Section Ch, Week 9406, Derwent Publications Ltd., London, GB, Class D13, AN 94–047180, XP002034255 & SU 1 787 413 A (Dairy Ind Res Inst), Jan. 15, 1993.

"Spray Drying Handbook", K. Masters, pp. 596–597, George Godwin, London, 1985.

*Primary Examiner*—Leslie Wong

[57] ABSTRACT

A process and an apparatus for converting liquid by-products, such as whey and permeates of whey, derived from cheese making processes into substantially free-flowing, non-caking powdery products. The process comprises the stages of vacuum evaporation of the whey to a solids content of 65–80%, crystallization of the whey concentrate and air drying the whey, wherein the main stream of initially cooled whey concentrate passing through stages of crystallization, is fed with a secondary and/or tertiary stream to be mixed with the main stream. The apparatus is provided with a secondary and/or a tertiary conduit for feeding a secondary and/or tertiary stream to the main stream in the main conduit connecting means for collection and pretreatment of whey, vacuum evaporation of the whey, crystallization of the whey concentrate and air drying the whey. The feeding of a secondary and/or tertiary stream reduces the sticky nature of whey, leading to whey that is more easy to handle during the processing, and resulting in less wear of the apparatus.

27 Claims, 5 Drawing Sheets

PROCESS AND APPARATUS FOR CONVERTING LIQUID WHEY INTO POWDER

This application is the national phase under 35 U.S.C. § 371 of prior PCT International Application No. PCT/DK97/00131 which has an International filing date of Mar. 25, 1997 which designated the United States of America.

FIELD OF THE INVENTION

The present invention relates to a process and apparatus for converting liquid by-products, such as whey and permeates of whey, derived from cheese making processes into substantially free-flowing, non-caking powdery products as well as use of the process and the apparatus.

BACKGROUND OF THE INVENTION

Raw whey is the liquid by-product resulting from traditional cheese making and casein manufacturing including acid whey, sweet whey, salt whey, permeates from the production of whey protein or milk protein concentrates and lactose etc., motherliquor from lactose crystallization, demineralised whey and similar products.

In the present context the term whey will be used for liquid raw whey which may have been subjected to various pre-treatments whose purpose is to improve the bacteriological quality, remove possible cheese fines and to reduce a possible content of fat and salts.

Depending on origin the whey contains 5.5–6.5% total solids, wherein 0.7–0.9% protein, 0.05% fat, 4.2–4.6% lactose and 0.5–0.8% ash.

Usually, after a number of pre-treatments, the aqueous whey is a solution in which the lactose is in an equilibrium of 60% beta- and 40% alpha molecular form. This mixture is hygroscopic and unsuitable for creating a free flowing, non-caking powder.

However, a suitable powder can be obtained when a major part of the lactose is converted to the alpha monohydrate form, which is done by crystallization.

DESCRIPTION OF PRIOR ART

From the prior art there are known several described processes for converting liquid by-products, such as whey and permeates of whey derived from cheese making processes into substantially free-flowing, non-caking powdery products.

At the production processes commonly carried out by industry today crystallization is accomplished in batches by an inexpedient time-consuming and energy inefficient, non-continuos procedure. The space requirement for the process apparatus is furthermore voluminous. By these processes (Masters, Spray Drying Handbook, 4 ed. 1985, p. 596) the whey product with 50 to 65% total solids is immediately after evaporation cooled slowly batchwise in large space requirering tanks provided with slow moving agitators. After crystallization the concentrate is spray dried to its final moisture content and cooled in a fluid bed.

At yet another similar prior art process with multiple crystallization stages, (Masters 4 ed. 1985, p. 597, FIG. 15.12), a first crystallization stage is obtained in large tanks as just described above. The concentrate is then spray dried to a moisture content of about 10 to 12% and the wet powder is left on a continuous belt conveyer for final crystallization. The product is then milled and dried to its final moisture in a fluid bed. In this way a non-hygroscopic, free flowing powder with up til 95% of the lactose may be obtained.

From U.S. Pat. No. 2,336,461 is known a process, in which liquid whey is initially concentrated in a multiple effect vacuum evaporator and further concentrated on a heated drum to a substance with 50 to 65% total solids (TS). The crystallization is carried out in a space requiring apparatus by depositing the pasty concentrate on a slow moving and length requiring belt where the concentrate rests, while the lactose crystallizes to form the alpha mono-hydrate. The residence time on the belt is typically 10 minutes and moisture in the pasty material provides the crystal water to form the alpha monohydrate. Product from the belt is milled and a substantially free-flowing, non-caking powder is obtained.

In a more recent described procedure (U.S. Pat. No. 5,006,204) the belt is substituted by a slowly rotating disk to receive partially dried whey powder from the spray dryer and deliver it to the fluid bed while permitting time for crystallization.

The mentioned prior art processes all have several drawbacks.

First, the energy efficient evaporation process can only be used to concentrate the whey to 50 to 65% TS while the rest of the water evaporation requires a less energy-efficient air dryer.

Second, the necessary belts, rotating disks or crystallization tanks are large, space and labour requiring equipment's.

EP 205 601 (Anhydro) describes yet another process for production of a substantially free-flowing, non-caking powdery product from whey, whereby the whey is concentrated to 75% TS in the energy efficient vacuum evaporators. Thereafter the concentrate is passed once through a heat exchanger for cooling and crystallization. The whey paste, which now has a high content of alpha monohydrate lactose is fed to a spin flash dryer which converts the paste into a dry non-caking powder.

It has been found, however, that the whey paste in this process exhibits an extremely high viscosity and very difficult to disintegrate in the spin flash dryer at elevated temperatures. Therefore, this process only allows for relatively low drying temperatures which makes it very energy inefficient. The process has not been implemented by the whey-processing industry.

Accordingly, for a long time the industry has had an unfulfilled demand for a new process for converting liquid by-products, such as whey and permeates of whey, derived from cheese making processes into substantially free-flowing, non-caking powdery products, and which process is more energy efficient than the prior processes implemented by industry and at the same time provides an apparatus requiring much lesser space than the previous apparatuses.

DESCRIPTION OF THE INVENTION

The present invention relates to a process for converting whey into substantially free-flowing, non-caking powdery products comprising the steps of collection and pretreatment of the whey, vacuum evaporation of the collected whey obtaining a whey paste concentrate with 65–80% solid and in which the entire content of lactose is in solution, crystallization of the whey paste concentrate transforming most of its lactose content into alpha-monohydrate form comprising at least a first stage of crystallization whereby the whey concentrate is initially cooled as well as a final stage of crystallization whereby the whey concentrate is finally cooled so that 80 to 95% of the lactose will be present as alpha monohydrate, and air drying said crystallized whey obtaining free-flowing, non-caking powder,
wherein a secondary stream is fed to be mixed with the main stream of initially cooled whey concentrate passing through the stages of crystallization.

The process is especially suitable for producing whey powders which due to formation of sticky products are very difficult to dry, even when a high quality crystallized product is required. Besides the process enables savings as regards both operational costs, space requirements and capital investment.

By this process it is possible to produce a substantially free-flowing, non-caking powdery product from whey and materials derived from whey by an energy efficient process.

In the present context, the term "whey" is intended to mean any liquid by-products from the cheese-making process. Examples of liquid by-products are as defined above for raw whey.

The feeding of a secondary stream to the main stream increases the concentration of total solids of the main stream compared to the concentration of total solids in the main stream after the initial cooling. It was surprisingly found by the present inventors, that the addition of a secondary stream did alter the properties of the whey by reducing the sticky nature of the whey, making the handling more easy.

Another purpose of the feeding of the secondary stream is to feed additives to the whey. Thus, the content of the secondary stream may depend on the use of the finally obtained free-flowing, non-caking powder.

For many uses, such as futter, it will be convenient to feed additional nutritional material to the main stream in order to obtain a finally obtained free-flowing, non-caking powder suitable as futter, either directly or by adding a few more additives.

Accordingly, the secondary stream may comprise fats, proteins, carbohydrates, minerals or mixtures of these as well as fly ash.

Examples of fats are animal or vegetable fats, such as suet, butter, butter fat, coconut oil, palm kernel oil.

Examples of proteins are animal and vegetable proteins, such as proteins from milk, proteins from egg, soy proteins.

Examples of carbohydrates are lactose, starches, flour, sugars, dextroses. Examples of minerals are salts of calcium, sodium and potassium.

Normally a mixture of the above would be used, such as skimmed milk powder, whole milk powder and whey protein concentrates.

However, the secondary stream may also comprise crystallized whey.

An embodiment of the present invention is the feeding of the secondary stream by withdrawing a secondary stream of crystallized whey from the main stream of finally cooled, crystallized whey, and recycling said secondary stream of crystallized whey to be mixed with the main stream of initially cooled whey concentrate passing through the stages of crystallization.

The secondary stream may then be withdrawn at any stage after the final cooling. It is preferred to withdraw the secondary stream from the main stream of finally dried free-flowing, non-caking powder.

When the secondary stream is obtained by withdrawal from the main stream, a further embodiment of the present invention is the feeding of a tertiary stream to be mixed with the initially cooled whey concentrate passing through the stages of crystallization.

The tertiary stream may comprise any of the materials defined for the secondary stream above.

The tertiary stream may be fed to the main stream of initially cooled whey concentrate passing through the stages of crystallization at any stage before the final cooling. The tertiary stream may be fed to the main stream before or after the feeding of the secondary stream.

The secondary stream and the tertiary stream may be combined or mixed before being fed to the main stream.

In an embodiment of the present invention, the secondary stream is fed to an intermediary stage of crystallization, wherein a continuous mixing operation is being performed to provide agitation and residence time, to change the properties of the product emerging from the mixing means, and furthermore in some instances to reduce the amount of energy used as well as to reduce the wear of the mixing means.

To adjust the content of total solids in the main stream before the stage of the mixing means within a specified range, the content of total solids in the main stream after the initial cooling may be measured. An example of measurement may be withdrawal from the main stream immediately after the initial cooling stage of a sample, and obtaining a measure of the content of total solids in the sample.

The result from the measurement may be used to adjust the flow of the secondary and/or tertiary stream to obtain the specified content of total solids before the stage of the mixing means. The adjustment of the secondary and/or tertiary streams may be carried out manually or by an automatic process.

Another example of measurement is where a sample is withdrawn immediately before the stage of the mixing means and the other steps are performed as described above.

The flow of the secondary stream and/or the tertiary stream may thus be adjusted to obtain a content of total solids (TS) in the main stream before the stage of the mixing means to 80–95%, such as 80 to 90%.

In the present context, the term "TS" means total solids in a product or an intermediate as $$\text{kg dry solid/kg product}$$

The main stream of finally cooled, crystallized whey may furthermore be disintegrated to obtain a powder form. This stage is depending on the final use of the powder.

Also, to reduce the free moisture the main stream of crystallized powder may be air-dried. In a preferred embodiment the powder is air-dried to obtain substantially free-flowing, non-caking powder having between 1 and 5% free moisture, such as 1 to 3% free moisture.

The process can according to a further embodiment during the step of the crystallization of the whey paste concentrate wherein most of its lactose content is transformed to alpha-monohydrate form comprise the following steps:
  initially mixing the whey paste in a vessel to provide agitation and residence time,
  withdrawing from the vessel a first stream of whey concentrate to be cooled to a temperature of 10 to 50° C. initiating formation of crystals of lactose as alpha monohydrate,
  recycling the cooled stream of whey concentrate to said mixing vessel,
  withdrawing a main stream of whey concentrate from the vessel for the further stages of processing.

This stage will normally only be carried out with low viscosity whey, such as whey permeate.

The process of the present invention may be carried out in an apparatus as described below, which is a further object of the invention.

The apparatus comprises;

means for collection and pretreatment of the whey, means for vacuum evaporation of the collected whey obtaining a whey paste concentrate with 65–80% solid and in which the entire content of lactose is in solution, means for crystallization of the whey paste concentrate transforming most of its lactose content into alpha-monohydrate form, and means for air dying said crystallized whey obtaining free-flowing, non-caking powder, which means are interconnected by a main conduit, and wherein, said means for crystallization comprises a heat exchanger adapted to initially cooling of the whey, as well as comprises a continuously driven mixer to be passed by the main flow of whey, and a secondary conduit extending to the main conduit part leading to the continuously driven mixing vessel.

A further embodiment of the apparatus is wherein the secondary conduit is a conduit extending in a closed loop connection from a part of the main conduit conveying finally crystallized whey to the main conduit part leading to the continuously driven mixing vessel.

Another embodiment of the invention is an apparatus, wherein a tertiary conduit is a conduit extending to the main conduit part leading to the continuously driven mixing vessel.

By this apparatus is it possible to feed two different streams to the main stream in the main conduit. The feeding of the two streams may be carried out independent from each other, or by a common control mechanism.

The secondary conduit and the tertiary conduit may extend to different parts of the main conduit, such as the secondary conduit extending to a part of the main conduit leading to the continuously driven mixing vessel upstream of the part of the main conduit whereto the tertiary conduit is extending or the secondary conduit extending to a part of the main conduit leading to the continuously driven mixing vessel downstream of the part of the main conduit whereto the tertiary conduit is extending the opposite way. Upstream and downstream are in this context intended to mean in the direction of the flow in the main conduit.

The secondary and the tertiary conduits can also extend to a common conduit extending the main conduit leading to the continuously driven mixing vessel.

The apparatus is thus adapted for carrying out the above mentioned process, wherein a secondary stream is fed to the main stream to increase the content of total solids and/or raise the nutritional value of the finally dried free-flowing, non-caking powder.

To obtain a whey concentrate in which 80 to 95% of the lactose will be present as alpha monohydrate lactose crystals the apparatus comprises means for crystallization that further comprises a cooler to be passed by the main stream during a final stage of crystallization.

To control the content of the total solids in the main stream the secondary conduit and/or the tertiary conduit comprise means adapted for adjusting the flow amount of said second and/or third stream of powder to ensure a total solids content at beginning of the continuous mixing operation to be 80 to 95% solids (TS), such as 80 to 90% solids (TS).

The secondary and tertiary conduit will normally lead powder to the main conduit, but the powder may in this context also be interpreted as wetted powder or powder in solution, depending on the purpose of the feeding.

The secondary conduit being a conduit extending in a closed loop from a part of the main conduit, the secondary conduit may extend from any part of the main conduit downstreams the continuously driven mixer. An example is wherein the secondary conduit extends from the part of the main conduit extending away from the air drier means conveying the main stream of finally dried free-flowing, non-caking powder.

In order to further process the finally cooled, crystallized whey, a disintegrator adapted to disintegrate said main stream of finally cooled, crystallized whey obtaining powder form may be provided.

Furthermore, the crystallized whey powder can be further dried in a fluid bed adapted to dry for finally obtaining free-flowing, non-caking powder.

Wherein said means for crystallisation comprises a mixing vessel with continuously driven mixing means the apparatus may also be provided with a secondary conduit extending in a closed loop connection from the dispensing part of the mixing vessel and to the main conduit leading to the mixing vessel wherein a heat exchanger is interconnected in the secondary conduit.

An apparatus as described above is well suited for converting whey into substantially free-flowing, non-caking powdery products due to the means that ensure that the sticky whey intermediates are converted to less sticky intermediates that are more easy to handle in the apparatus, thus obtaining the free-flowing, non-caking powder with less use of energy and with less wear and tear of different parts of the apparatus.

Furthermore, as compared to the hitherto known apparatuses for converting whey into powder the present apparatus requires much less space compared to the traditional apparatuses. The present apparatus is therefore very cost effective, in that both the construction of the apparatus itself and the building for the apparatus only present ½ or less of the expenses of the traditionally apparatuses. The new apparatus has therefore proven to exhibit a superior production capacity as well as efficiency.

The powder obtained may be used for a wide variety of purposes, where a preferred use is for feed. In this connection it has proven very ideal to feed a secondary stream and/or a tertiary stream with additives to the feed. Thus, the feed is already mixed when emerging as free-flowing, non-caking powder or may only have to be mixed with few other ingredients afterwards.

DESCRIPTION OF AN EMBODIMENT OF THE INVENTION

The invention is further described with reference to the drawing, where

Figure 1:
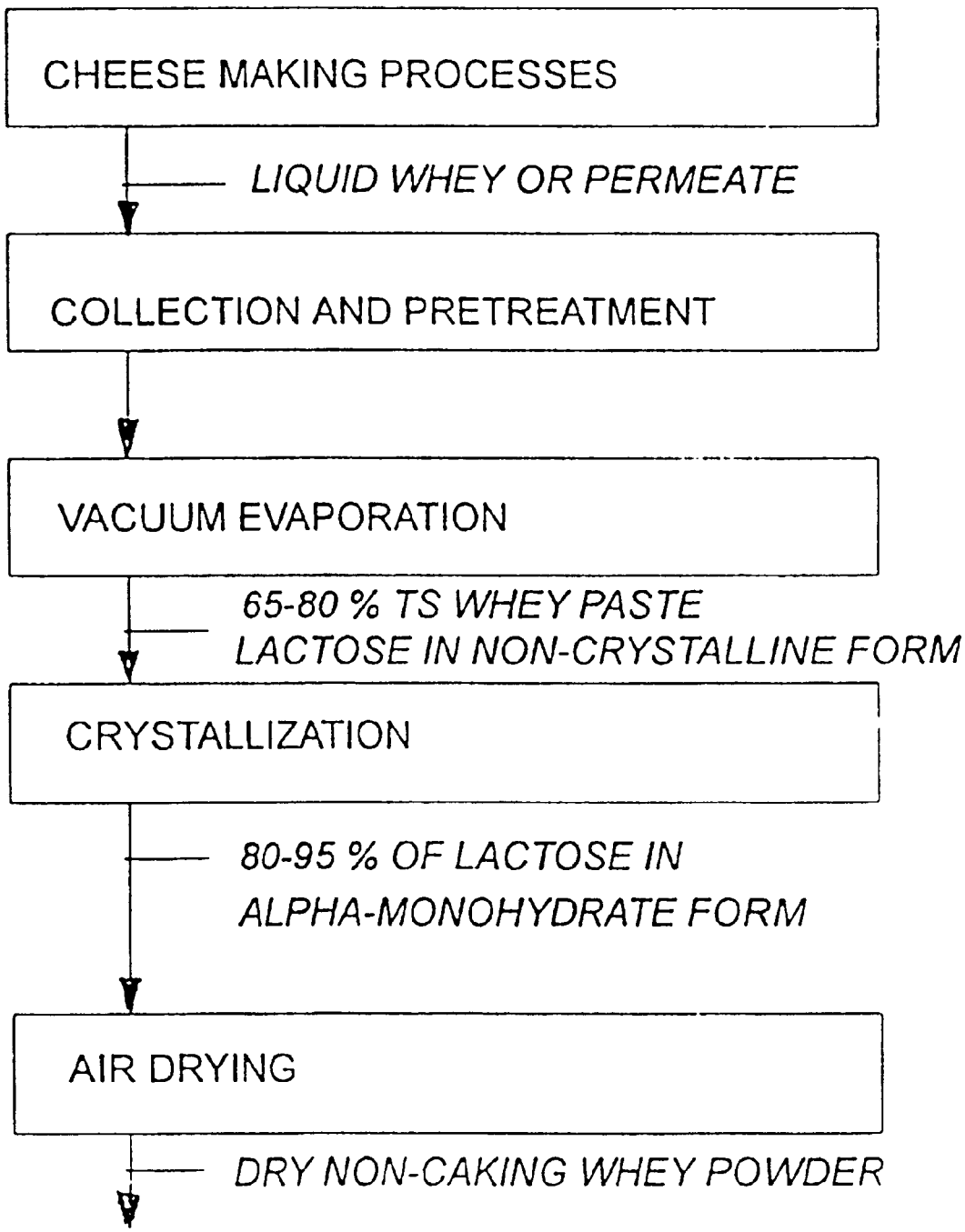
FIG. 1 is a flow diagram of the general steps of the process of converting liquid whey into powder.
Figure 2:
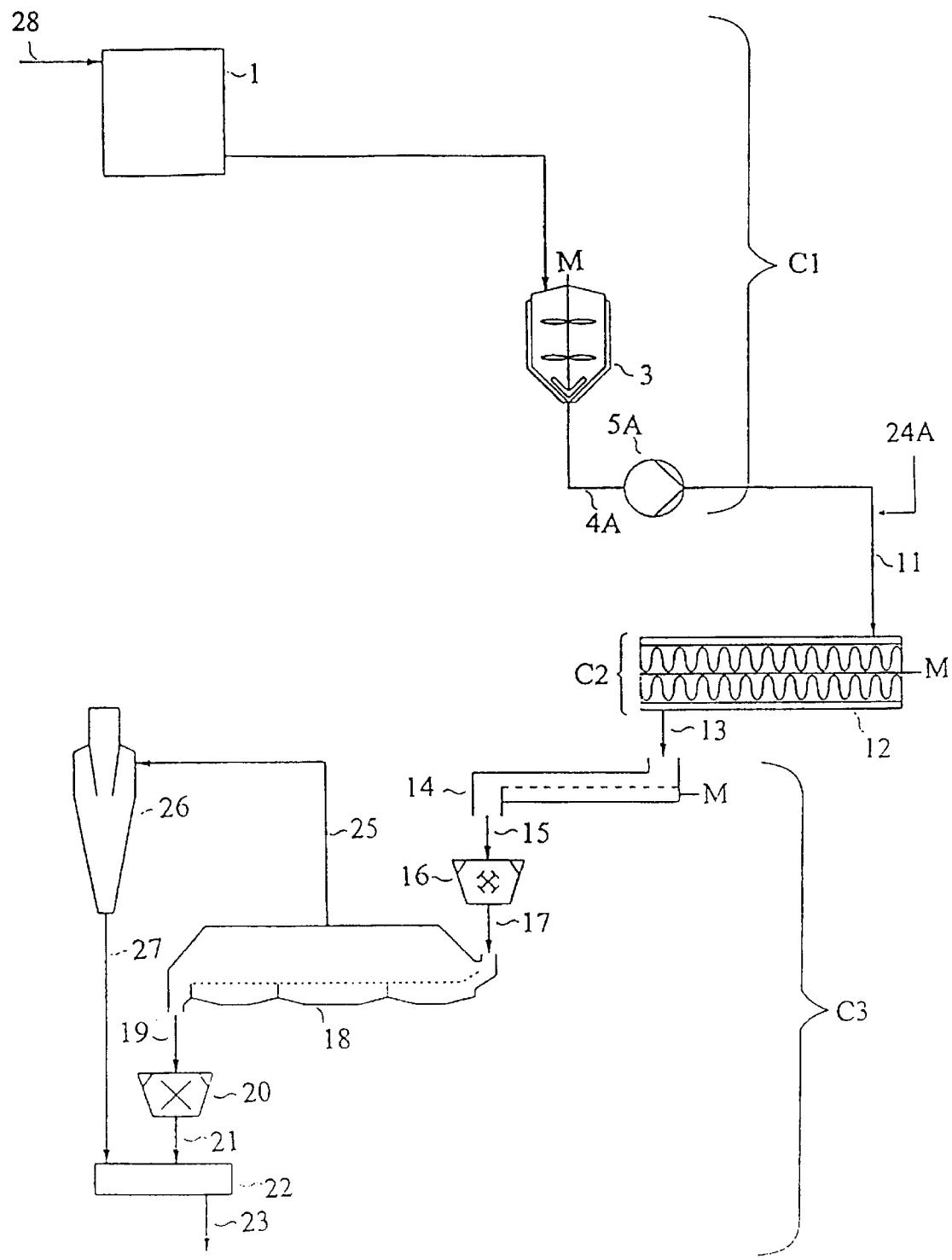
FIG. 2 is a schematic diagram of the apparatus according to the present invention wherein a secondary conduit is extending to the main conduit.

By the process according to the invention liquid whey is collected and pretreated from the cheese making process by conventional means, please ref. to FIG. 1. The liquid whey is passed on to a schematically shown multistage vacuum evaporator 1 by a main conduit 28 as shown by FIG. 2.

In continuous operation whey concentrate from the evaporator 1 with 65–80% total solids (TS) is passed on by the main conduit part 2 and introduced into an initial or first crystallization stage C1 by entering the continuously driven mixing vessel 3.

A main stream of concentrate leaves the mixing vessel 3 via the main conduit part 4A and is pumped continuously by a pump 5A on to a further or intermediary crystallization stage C2 via the main conduit part 11.

During start up the withdrawal pump 5A is controlled until the amount of product in the mixing vessel 3 is ensured an adequate residence time for the first stage of crystallization during continuous operation, so that between 40 and 80% of the lactose in the withdrawn main stream of concentrate is present as crystalline alpha monohydrate.

At the intermediary stage of crystallization the main stream of whey concentrate is lead via the main conduit part 11 and through a continuously driven mixer 12.

A secondary conduit 24A extends to the main conduit part 11 leading to the continuously driven mixing vessel 12.

The flow amount of said second stream of powder is adjusted to ensure a total solids content at beginning of the continuous mixing operation to be 80 to 90% solids (TS).

The continuous mixer 12 converts the whey concentrate into a partly crystallized product which is passed on to a further or final crystallization stage via the main conduit part 13.

At third or final crystallization stage C3 the concentrate is passed through a cooler 14, which at the shown embodiment is a cooled belt conveyer.

Via a main conduit part 15 the obtained product is passed on to a disintegrator 16 for milling and is passed further on via the main conduit part 17 to be dried to its final moisture (between 1 and 5% free moisture) in a fluid bed 18.

The whey powder is passed on by the main conduit part 19 and after final milling in disintegrator 20 the product is divided by a divider device 22 into the secondary stream 24 of recycled powder and the final main stream 23 of free-flowing, non-caking whey powder.

Figure 3:
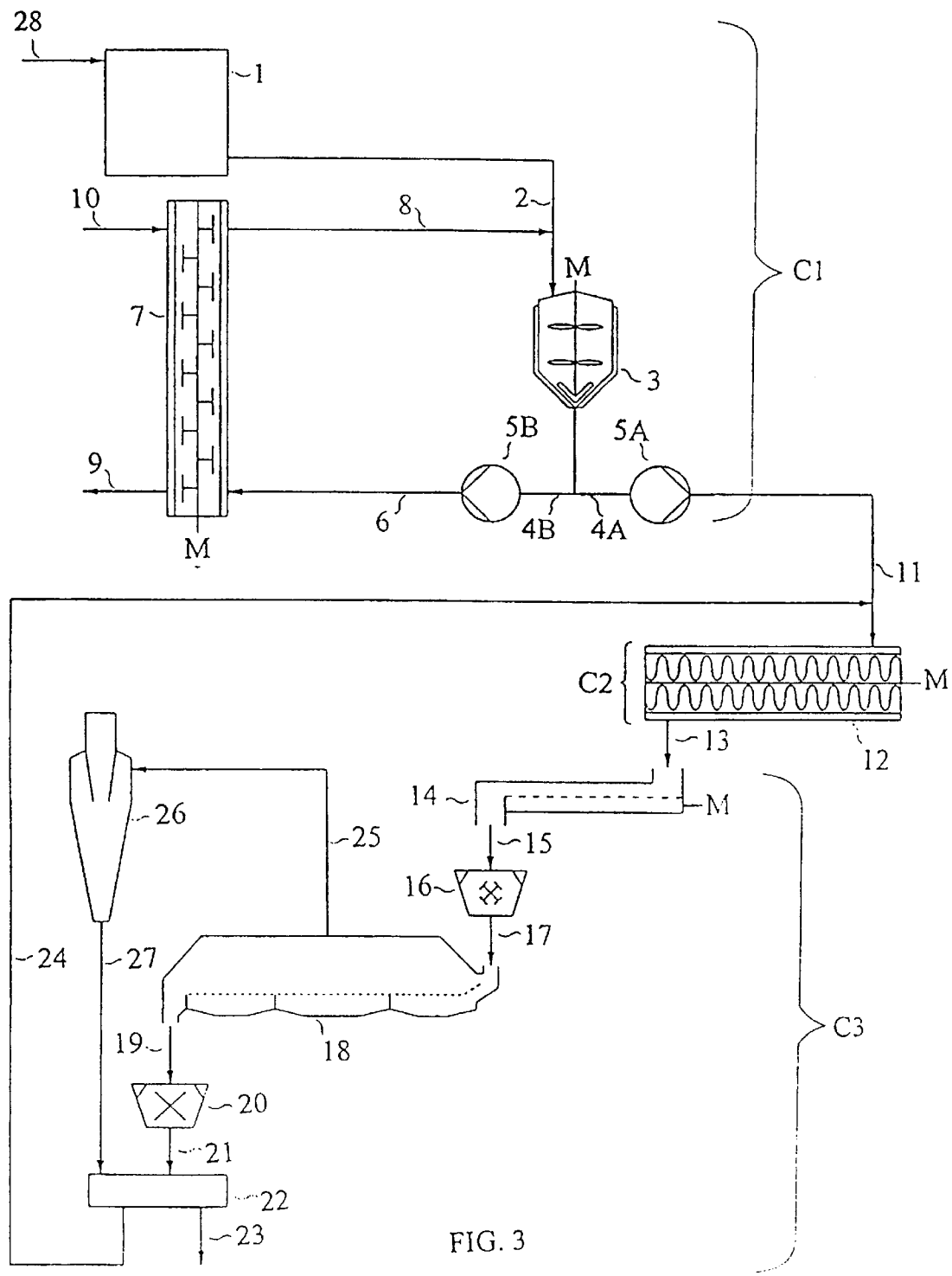
FIG. 3 is schematic diagram of the apparatus according to the present invention wherein a secondary conduit is extending in a closed loop connection from a part of the main conduit to the part of the main conduit leading to the continuously driven mixing vessel.

In FIG. 3 the secondary conduit 24 of the final crystallization stage C3 extends in a closed loop connection from a part 21 of the main conduit transporting finally crystallized whey (at divider device 22) and to the main conduit part 11 leading to the continuously driven mixing vessel 12. Furthermore, at the first crystallization stage, a secondary stream of crystallized whey concentrate is withdrawn from the mixing vessel 3 via a secondary conduit 4B and is pumped by a pump 5B via a further conduit part 6 on to a heat exchanger 7. Cooling water is introduced to the heat exchanger 7 via inlet 10 and removed via outlet 9.

Cooled whey concentrate with a temperature of 10 to 50° C. is recycled via the conduit part 8 to the mixing vessel 3.

Figure 4:
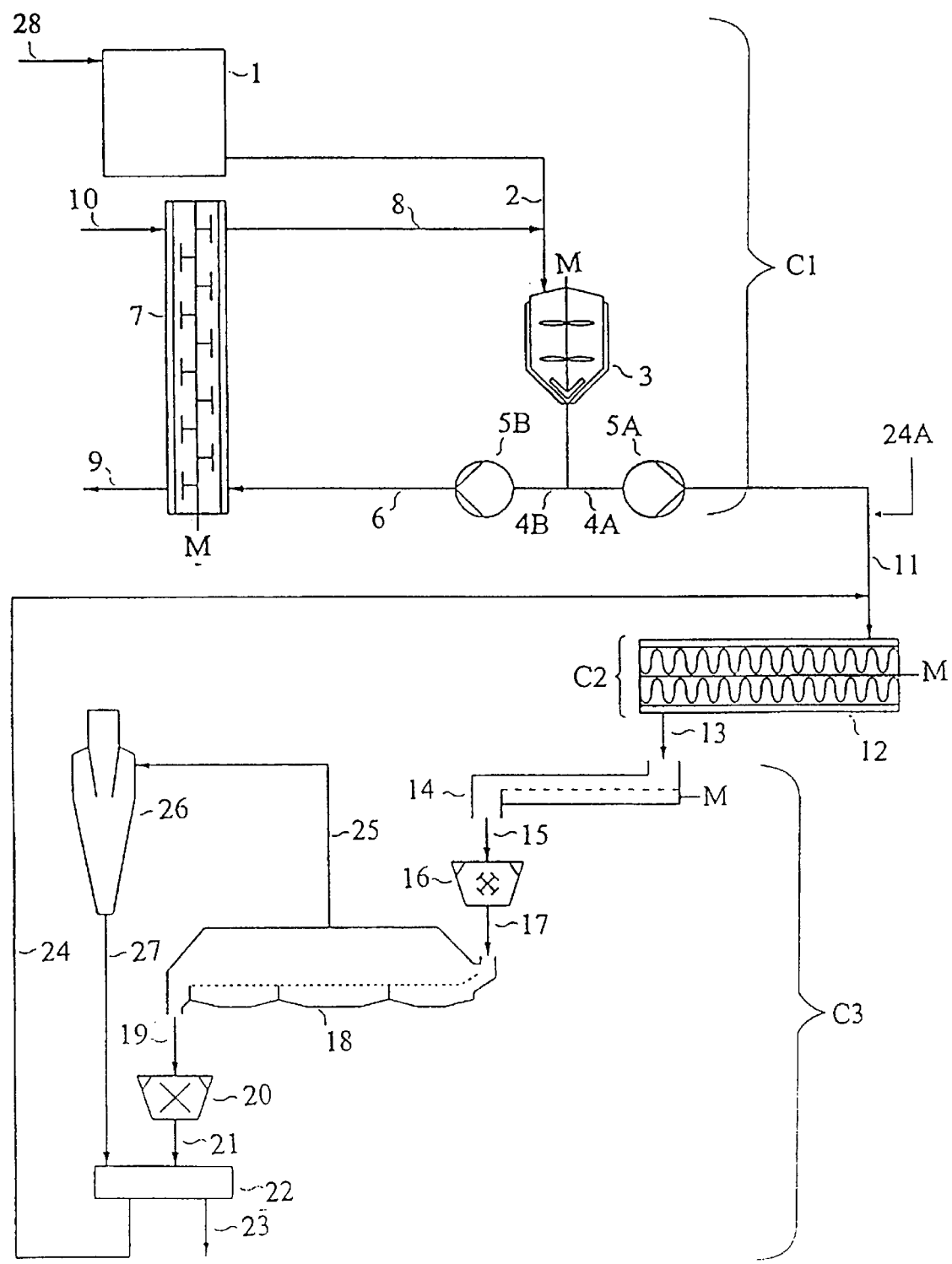
FIG. 4 is schematic diagram of the apparatus according to the present invention wherein a secondary conduit and a tertiary conduit are extending to the main conduit.
Figure 5:
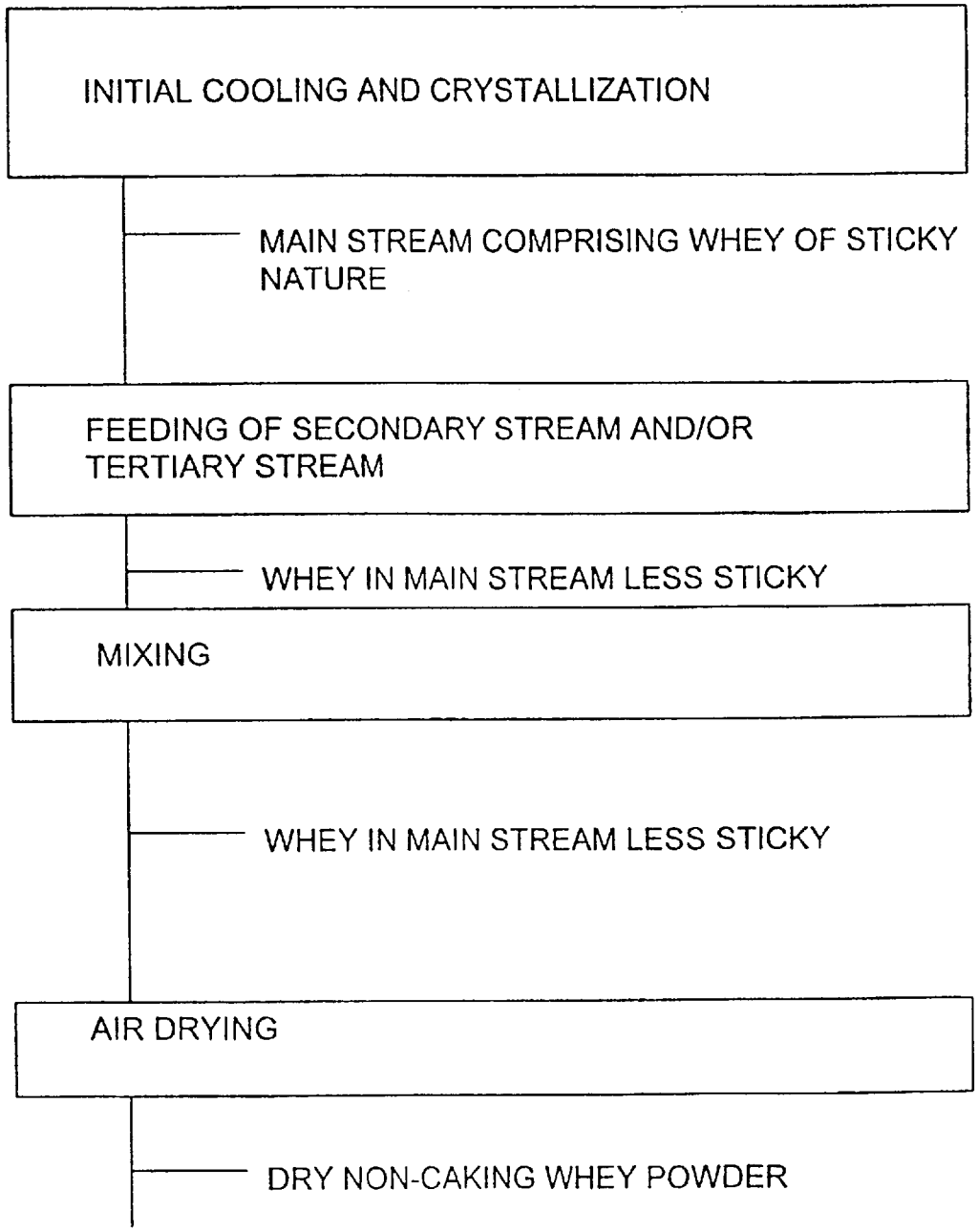
FIG. 5 is a flow diagram showing one of the essential features of the invention.

In FIG. 4, two conduits 24 and 24A (secondary and tertiary conduit) extend to the main conduit.

The process according to the invention will be further illustrated by the following example:

Whey from manufacture of hard cheese (pretreated sweet whey) with a content of 6.0% total solids was fed with a rate of 1100 kg/h to a multiple effect vacuum evaporator with finisher with thermal recompression and was concentrated to 91.7 kg/h with 72.0% TS and a temperature of 80° C. The concentrate contained no crystals.

The concentrate was cooled and mixed in a continuous cycle through mixing vessel 3 and heat exchanger 7. During the continuous operation, a concentrate temperature of 35° C. was obtained.

The amount of product in the mixing vessel was kept at a level, equal to a total active product volume in heat exchanger plus mixing vessel of 8 liters, corresponding to a residence time of 6.5 minutes.

It was found (by refractometry) that 50% of the total amount of lactose in the concentrate withdrawn via pump 5A was present as alpha monohydrate lactose crystals.

The withdrawn concentrate was mixed with 108 kg/h powder from the divider 22 which means, that a mixture of 200 kg/h with 85% TS was fed to the continuous mixer 12. The continuous mixer 12 (an extruder) was equipped with a screen with 5 mm holes, 50% of free area and a cutter.

The extrudate from the continuous mixer 12 were fluid bed dried at 18 to 2% moisture at inlet/outlet temperatures 120/80 C. and cooled with ambient air to 30 C.

A flow of 68.0 kg/h final powder with 2% moisture was obtained.

The flowability property was determined by measurement of the Haussner ratio.

As further described in e.g. Svarovsky, L., Powder Testing Guide, Elsevier (1987) the Haussner ratio is defined as the ratio of the tapped bulk density to the untapped density. A value of the Haussner ratio close to unity indicates weak interparticle forces ensuring excellent flowability whereas a high value e.g. 1.4 indicates poor flowability.

The Haussner ratio for the powder produced according to the invention was measured to 1.10, and the Haussner ratio for a similar powder produced by ordinary spray drying was measured to 1.46.

The caking property was determined (24 hours at relative humidity 60%, 20 C.) and evaluated as "non-caking".

Solubility index (according to ADMI-standard) was measured to 0.1, indicating an excellent quality.

The specific consumption of energy (kJ per kg produced powder) was calculated to less than 85% of the energy consumption by ordinary industrial spray drying.

We claim:

1. A process for converting whey into free-flowing, non-caking powdery products comprising the steps of collection and pretreatment of the whey, vacuum evaporation of the collected whey obtaining a whey paste concentrate with 65–80% solid and in which the entire content of lactose is in solution, crystallization of the whey paste concentrate transforming most of its lactose content into alpha-monohydrate form comprising at least a first stage of crystallization whereby the whey concentrate is initially cooled as well as a final stage of crystallization whereby the whey concentrate is finally cooled so that 80 to 95% of the lactose will be present as alpha monohydrate, and air drying said crystallized whey obtaining free-flowing, non-caking powder, wherein a secondary stream is fed to be mixed with the main stream of initially cooled whey concentrate passing through the stages of crystallization.

2. Process according to claim 1, wherein the secondary stream comprises fats, proteins, carbohydrates, minerals or mixtures of these.

3. Process according to claim 1, wherein the secondary stream comprises crystallized whey.

4. Process according to claim 1, wherein the secondary stream is obtained by withdrawing a secondary stream of crystallized whey from the main stream of finally cooled, crystallized whey,
recycling said secondary stream of crystallized whey to be mixed with the main stream of initially cooled whey concentrate passing through the stages of crystallization.

5. Process according to claim 4, wherein said secondary stream of crystallized whey is withdrawn from the main stream of finally dried free-flowing, non-caking powder.

6. Process according to claim 4, wherein a tertiary stream is fed to be mixed with the main stream of initially cooled whey concentrate passing through the stages of crystallization.

7. Process according to claim 6, wherein the secondary stream and the tertiary stream is mixed before being fed to the main stream.

8. Process according to claim 6, wherein the tertiary stream comprises fats, proteins, carbohydrates, minerals or mixtures of these.

9. Process according to claim 1, wherein said secondary stream is fed to an intermediary stage of crystallization wherein a continuous mixing operation is being performed to provide agitation and residence time.

10. Process according to claim 1, wherein the concentration of total solids in the main stream after the initial cooling is measured, and the flow of the secondary and/or tertiary stream is adjusted depending on the concentration measured.

11. Process according to claim 1, wherein the flow amount of said secondary stream and/or the tertiary stream is adjusted to ensure a total solids content at beginning of the continuous mixing operation to be 80 to 95% solids (TS).

12. Process according to claim 1, wherein the flow amount of said secondary stream is adjusted to ensure a total solids content at beginning of the continuous mixing operation to be 80 to 90% solids (TS).

13. Process according to claim 1, wherein said main stream of finally cooled, crystallized whey is disintegrated to obtain a powder form.

14. Process according to claim 1, wherein said main stream of crystallized powder is air-dried to obtain free-flowing, non-caking powder having between 1 and 5% free moisture.

15. Process according to claim 1, wherein during the step of the crystallization of the whey paste concentrate the following steps are comprised:
initially mixing the whey paste in a vessel to provide agitation and residence time,
withdrawing from the vessel a first stream of whey concentrate to be cooled to a temperature of 10 to 50° C. initiating formation of crystals of lactose as alpha monohydrate,
recycling the cooled stream of whey concentrate to said mixing vessel,
withdrawing a main stream of whey concentrate from the vessel for the further stages of processing.

16. An apparatus for carrying out the method according to claim 1 and comprising:
means for collection and pretreatment of the liquid by-product, hereinafter called whey only, from the cheese-making process,
means for vacuum evaporation of the collected whey obtaining a whey paste concentrate with 65–80% solid and in which the entire content of lactose is in solution,
means for crystallization of the whey paste concentrate transforming most of its lactose content into alpha-monohydrate form, and
means for air drying said crystallized whey obtaining free-flowing, non-caking powder,
which means are interconnected by a main conduit, and wherein,
said means for crystallization comprises a heat exchanger adapted to initially cooling of the whey, as well as comprises a continuously driven mixer to be passed by the main flow of whey,
and a secondary conduit extending to the main conduit part leading to the continuously driven mixing vessel.

17. Apparatus according to claim 16, wherein the secondary conduit is a conduit extending in a closed loop connection from a part of the main conduit conveying finally crystallized whey to the main conduit part leading to the continuously driven mixing vessel.

18. Apparatus according to claim 17, wherein a tertiary conduit is a conduit extending to the main conduit part leading to the continuously driven mixing vessel.

19. Apparatus according to claim 18, wherein the secondary conduit and the tertiary conduit extend to a common part extending to the main conduit leading to the continuously driven mixing vessel.

20. Apparatus according to claim 16, characterized in, that said means for crystallization further comprises a cooler to be passed by the main stream during a final stage of crystallization to provide a whey concentrate in which 80 to 95% of the lactose will be present as alpha monohydrate lactose crystals.

21. Apparatus according to claim 16, characterized in that the secondary conduit comprises means adapted for adjusting the flow amount of said second stream of powder to ensure a total solids content at beginning of the continuous mixing operation to be 80 to 95% solids (TS).

22. Apparatus according to claim 21, characterized in that the secondary conduit comprises means adapted for adjusting the flow amount of said second stream of powder to ensure a total solids content at beginning of the continuous mixing operation to be 80 to 90% solids (TS).

23. Apparatus according to claim 16, characterized in that the secondary conduit extends from the part of the main conduit extending away from the air drier means conveying the main stream of finally dried free-flowing, non-caking powder.

24. Apparatus according to claim 16, characterized in that said means for crystallization further comprises a disintegrator adapted to disintegrate said main stream of finally cooled, crystallized whey obtaining powder form.

25. Apparatus according to claim 16, characterized in that said means for air drying said crystallized whey powder comprises a fluid bed adapted to dry for finally obtaining free-flowing, non-caking powder.

26. Apparatus according to claim 16, wherein said means for crystallisation comprises a mixing vessel with continuously driven mixing means
a secondary conduit extending in a closed loop connection from the dispensing part of the mixing vessel and to the main conduit leading to the mixing vessel,
a heat exchanger interconnected in the secondary conduit.

27. A process for converting whey into free-flowing, non-caking powdery products comprising converting whey in an apparatus comprising,
means for collection and pretreatment of the liquid by-product, hereinafter called whey only, from the cheese-making process, means for vacuum evaporation of the collected whey obtaining a whey paste concentrate with 65–80% solid and in which the entire content of lactose is in solution, means for crystallization of the whey paste concentrate transforming most of its lactose content into alpha-monohydrate form, and means for air drying said crystallized whey obtaining free-flowing, non-caking powder, which means are interconnected by a main conduit, and wherein, said means for crystallization comprises a heat exchanger adapted to initially cool the whey, as well as comprises a continuously driven mixer to be passed by the main flow of whey, and a secondary conduit extending to the main conduit part leading to the continuously driven mixing vessel.

* * * * *